(12) United States Patent
Soane et al.

(10) Patent No.: US 8,795,534 B2
(45) Date of Patent: Aug. 5, 2014

(54) SYSTEMS AND METHODS FOR REMOVING OIL FROM FLUID STREAMS

(71) Applicants: David S. Soane, Chestnut Hill, MA (US); William Ware, Jr., Hanover, NH (US); Robert P. Mahoney, Newbury, MA (US); Ian Slattery, Cambridge, MA (US)

(72) Inventors: David S. Soane, Chestnut Hill, MA (US); William Ware, Jr., Hanover, NH (US); Robert P. Mahoney, Newbury, MA (US); Ian Slattery, Cambridge, MA (US)

(73) Assignee: Soane Energy, LLC, Cambridge, MA (US)

(*) Notice: Subject to any disclaimer, the term of this patent is extended or adjusted under 35 U.S.C. 154(b) by 0 days.

(21) Appl. No.: 13/669,104

(22) Filed: Nov. 5, 2012

(65) Prior Publication Data
US 2013/0168323 A1   Jul. 4, 2013

Related U.S. Application Data

(63) Continuation of application No. PCT/US2011/035305, filed on May 5, 2011.

(60) Provisional application No. 61/331,796, filed on May 5, 2010, provisional application No. 61/355,020, filed on Jun. 15, 2010, provisional application No. 61/349,648, filed on May 28, 2010.

(51) Int. Cl.
*B01J 49/00*   (2006.01)

(52) U.S. Cl.
USPC ........... 210/671; 210/679; 210/680; 210/693; 210/924; 210/925

(58) Field of Classification Search
USPC .................. 210/679–680, 671, 693, 924–925
See application file for complete search history.

(56) References Cited

U.S. PATENT DOCUMENTS

| | | | |
|---|---|---|---|
| 3,803,033 A | 4/1974 | Sutherland | |
| 4,182,689 A | 1/1980 | Presley et al. | |
| 5,229,006 A * | 7/1993 | Brinkley | 210/671 |
| 5,264,134 A * | 11/1993 | McCamy | 210/679 |
| 5,403,478 A | 4/1995 | Brinkley | |
| 2007/0012621 A1 | 1/2007 | Ginosar et al. | |
| 2007/0241059 A1 | 10/2007 | Beylich et al. | |
| 2009/0206040 A1 | 8/2009 | Berg et al. | |

* cited by examiner

*Primary Examiner* — Chester Barry
(74) *Attorney, Agent, or Firm* — Elmore Patent Law Group, P.C.; Mahreen Chaudhry Hoda; Carolyn S. Elmore

(57) ABSTRACT

The invention provides systems and methods for removing a target oil from an aqueous fluid stream using a capture medium. In embodiments, the capture medium can comprise an anchor substrate and a modifier technology supported on the anchor substrate, where the modifier technology complexes with the oil to form a removable complex.

6 Claims, 1 Drawing Sheet

Oil Absorbance vs. Water Absorbance for Tested Sorbent Materials

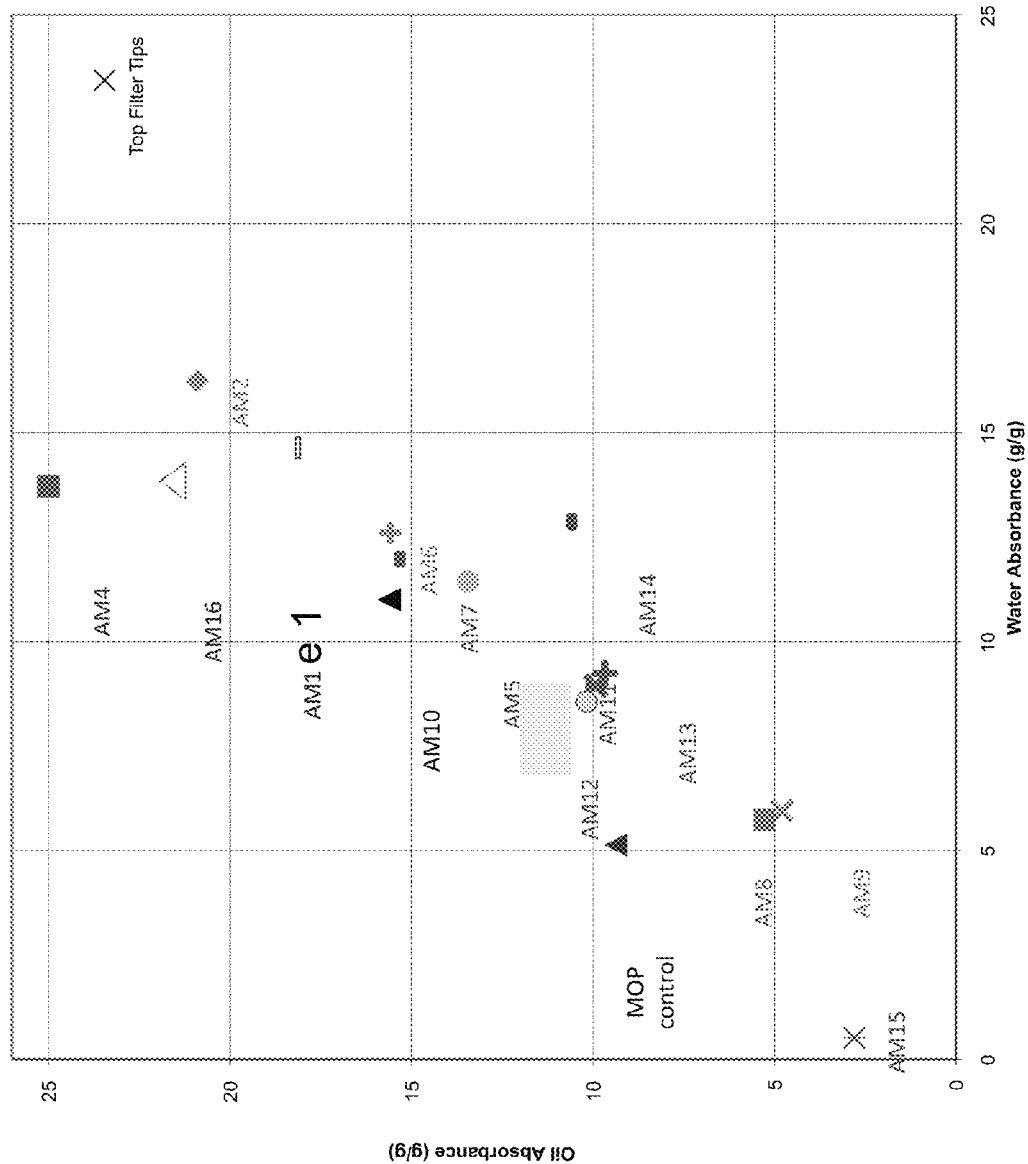

SYSTEMS AND METHODS FOR REMOVING OIL FROM FLUID STREAMS

RELATED APPLICATIONS

This application is a continuation of International Application No. PCT/US11/35305, which designated the United States and was filed on May 5, 2011, published in English, which claims the benefit of U.S. Provisional Application Ser. No. 61/331,796 filed May 5, 2010, U.S. Provisional Application Ser. No. 61/349,648 filed May 28, 2010 and U.S. Provisional Application Ser. No. 61/355,020 filed Jun. 15, 2010. The entire contents of the above-referenced applications are incorporated by reference herein.

FIELD OF THE APPLICATION

The application relates generally to removing oil from fluid streams.

BACKGROUND

Oil can be found admixed with a number of fluid streams, requiring its separation. For example, tailings ponds from oil sands processing contain a heavy oil called bitumen. Separating the bitumen from the tailings water can offer economic and environmental advantages. Refinery effluents can contain oil admixed with an aqueous stream. Bilge water and other types of industrial waste water can contain a quantum of oil admixed therein. Water used for or produced by hydraulic fracturing in oil or gas reservoirs can also contain a hydrocarbon component, for example crude oil. Water that is co-produced during oil production is typically treated by chemical and mechanical separation practices to recover the oil values and to minimize the contamination of the produced water effluent stream. After this conventional treatment, it is desirable to apply secondary treatment to meet environmental and regulatory objectives. Oil contaminated waters present challenges to treatment methods such as reverse osmosis, nanofiltration, ultrafiltration, diatomaceous earth filtration, activated carbon treatment, and the like. Removal of light chain and heavy chain hydrocarbons from aqueous fluid streams, including aliphatics, aromatics, and mixtures thereof, poses a significant challenge for oil drilling and production facilities and associated water treatment operations. It would be advantageous to provide efficient and cost-effective systems for separating the oil from the fluid stream.

As a salient example of oil contaminating an aqueous fluid stream, the Deepwater Horizon oil spill in 2010 demonstrated the challenges of separating these two components, and the damage that such oil contamination can cause. Oil floating in the open water decimates sea-faring birds and damages fish populations. When the oil approaches the shoreline, it coats the beaches, estuaries and wetlands, devastating living things that depend upon those habitats and wreaking immeasurable economic havoc. Once released, an oil spill proves very difficult to contain or deflect. Even more difficult is the task of removing it adequately from environmental contact.

Current methods of spill containment include physical and chemical approaches. For physical containment, booms or socks can be used, which act as barriers and which can have oil absorption capabilities. However, these mechanisms lose significant efficacy in the open ocean when conditions are rough, a situation that is not uncommon where oil spills occur. For chemical treatments, a variety of dispersants have been devised. Two significant drawbacks limit the efficacy of dispersant technologies. First, it is difficult to form stable microemulsions of the heavy crude that constitutes the spill. In essence, the oily blobs in the spill simply break up into smaller blobs when they encounter the dispersant, but the blobs do not disappear from the water surface. The smaller blobs can continue towards the shoreline with damaging effect. Second, even if stable microemulsions were achievable with a given dispersant, it is not clear that the emulsified system would cause less damage than the intact oil blobs. In fact, the emulsified oil system could spread more rapidly and widely, potentially amplifying the destruction.

To mitigate the potential damage of an open-water spill, it is desirable to cause the floating crude oil or other oily substance to be rapidly sequestered, for example by entrapment in a floating substrate. Alternatively, the floating oil or crude oil can be caused to sink rapidly and completely to the sea floor before it affects the marine population in the open ocean, and before it reaches landfall. Such approaches can offer the best chance of protecting vulnerable coastal fisheries and other ecosystems from the devastating impact of an open-ocean oil spill.

SUMMARY

Disclosed herein, in embodiments, are systems for removing a target oil from an aqueous fluid stream, comprising: a capture medium that complexes with the oil to form a removable complex that can be removed from the aqueous fluid stream, thereby removing the target oil from the aqueous fluid stream, wherein the capture medium comprises an anchor substrate and a modifier technology supported on the anchor substrate, the modifier technology complexing with the oil to form the removable complex. In embodiments, the anchor substrate has a density greater than that of the oil. In other embodiments, the anchor substrate has a density less than that of the oil. In embodiments, the anchor substrate comprises a plurality of loose particles or fibers. In embodiments, the anchor substrate is formed as a formed article. The formed article can be selected from the group consisting of a sheet, a fibrous network, a screen, a plurality of elongated fibers, an agglomeration of particulate matter, a mop, a boom, an open-cell foam mass, a closed-cell foam mass, and a swab. In embodiments, the modifier technology comprises an oleophilic capture substance. In embodiments, the modifier technology further comprises an attachment technology that modifies the surface of the anchor substrate to attach the oleophilic capture substance thereto. In embodiments, the attachment technology comprises a physical modification of the surface of the anchor substrate. In embodiments, the attachment technology comprises a mechanical mechanism for adhering the oleophilic capture substance to the surface of the anchor substrate. In embodiments, the attachment technology comprises an attachment chemical that attaches the oleophilic capture substance to the surface of the anchor substrate.

Also disclosed herein, in embodiments, are methods for removing a target oil from an aqueous fluid stream, comprising: preparing a capture medium comprising an anchor substrate and a modifier technology supported on the anchor substrate, wherein the modifier technology complexes with the target oil to form a removable complex, deploying the capture medium into contact with the target oil, directing the capture medium to contact the target oil for a contact time such that the capture medium forms a removable complex with the target oil, removing the removable complex from the aqueous fluid stream, thereby removing the target oil from the aqueous fluid stream, wherein the step of preparing takes place before the step of deploying. In embodiments, the anchor substrate has a density greater than that of the oil. In embodiments, the anchor substrate has a density less than that of the oil. In embodiments, the anchor substrate comprises a plurality of loose particles or fibers. In embodiments, the anchor substrate is formed as a formed article. In embodiments, the formed article is selected from the group consisting of a sheet, a fibrous network, a screen, a plurality of elongated fibers, an agglomeration of particulate matter, a mop, a boom, an open-cell foam mass, a closed-cell foam mass, and a swab. In embodiments, the modifier technology comprises an oleophilic capture substance. In embodiments, the modifier technology further comprises an attachment technology that modifies the surface of the anchor substrate to attach the oleophilic capture substance thereto. In embodiments, the attachment technology comprises a physical modification of the surface of the anchor substrate. In embodiments, the attachment technology comprises an attachment chemical that attaches the oleophilic capture substance to the surface of the anchor substrate. The method may further comprise the step of disposing of the removable complex. Also disclosed herein, in embodiments, are methods for removing a target oil from an aqueous fluid stream, comprising: combining the anchor substrate and a modifier technology supported on the anchor substrate to form a capture medium, wherein the modifier technology complexes with the target oil to form a removable complex, contacting the capture medium with the fluid stream bearing the target oil for a contact time such that the capture medium forms a removable complex with the target oil, and removing the removable complex from the aqueous fluid stream, thereby removing the target oil from the aqueous fluid stream. In embodiments, the step of combining takes place simultaneously with or following the step of contacting. In embodiments, the step of contacting further includes a step of directing the fluid stream into contact with the capture medium for the contact time.

BRIEF DESCRIPTION OF THE FIGURE

The FIGURE provides a graph showing oil absorbance and water absorbance for various sorbent materials.

DETAILED DESCRIPTION

Disclosed herein are systems and methods for capturing and sequestering an oily substance admixed with an aqueous fluid stream. As used herein, the term "oily substance" refers without limitation to hydrocarbons, i.e, oils that can be admixed deliberately or inadvertently with an aqueous fluid stream, for example crude oil, refined hydrocarbons, fuels, lubricants, oil spills, water insoluble hydrophobic materials, water soluble fractions of organic matter, resins, and paints, and the like, or any combination thereof, with the term "hydrocarbon" including aliphatics, aromatics, and heteroatom-substituted organics, further including linear, branched and cyclic organic chains. As an example, the oily substance can be dispersed in the fluid stream or contained within the fluid stream as one or more identifiable layers. In embodiments, the oily substance can be floating on an aqueous medium, such as crude oil spilled upon an open ocean. In other embodiments, the oily substance can be emulsified in the aqueous medium or dissolved in the aqueous medium. While embodiments are disclosed herein for treating oil spills such as crude oil that are released at sea, in other embodiments these systems and methods may be applied to other oil spills on aqueous surfaces, for example industrial spills into fresh water reservoirs, or spills of hydrophobic lubricants, fuels, and the like, from transportation activities, or oil contained within wastewater derived from oil-producing, oil-refining or oil-utilizing activities. Any oily substance identified for removal from the aqueous fluid stream can also be termed a "target oil."

Disclosed herein, in embodiments, are anchor substrates that are modified by coating them or otherwise attaching to them an oleophilic capture substance, whereby the oleophilic capture substance attracts the target oil in the oil spill and complexes with it. In embodiments, the resultant complex sinks to the bottom of the ocean or other body of water. In other embodiments, the resultant complex floats on the surface of the ocean or other body of water, and can be readily skimmed off In other embodiments, the resultant complex may neither float nor sink, but nonetheless can be sequestered to separate it (and its complexed target oil) from the fluid stream. In certain embodiments, the anchor substrate includes fibers or particles, lending themselves to removal techniques like filtration, skimming, vacuuming, and the like. In other embodiments, the anchor substrate can be formed as a continuous unit of larger dimensions to which the target oil is complexed, so that the anchor substrate and the attached oil is removed as a unit. As examples, the anchor substrate can be formed as sheets or booms to be applied to the target oil, as strands or netting to be applied to the target oil, as spheres or other geometric solids to be injected into the target oil, as foamed products made from natural or artificial materials, or the like. In certain embodiments, the capture medium (i.e., the anchor substrate and the modifier technology that it supports) can be positioned in a fixed location, and the aqueous fluid stream can be directed into contact with it. In other embodiments, as described above, the capture medium is deployed into contact with the fluid stream bearing the target oil. In either case, the capture medium is directed to contact the target oil for a contact time such that the capture medium forms a removable complex with the target oil. The contact time can vary, depending on factors such as temperature, exposed surface area, and the avidity of attraction between the target oil and the capture medium.

Provided herein, therefore, are systems and methods for removing a target oil from an aqueous stream comprising a capture medium that complexes with the target oil to form a removable complex that can be removed from the fluid stream, thereby removing the target oil from the aqueous fluid stream. The capture medium in these embodiments comprises an anchor substrate and a modifier technology supported on the anchor substrate, the modifier technology complexing with the oil to form the removable complex. In embodiments, the modifier technology further comprises an oleophilic capture substance, which can be attached to the surface of the anchor substrate with an attachment technology.

In certain embodiments, these systems and methods comprise three components: (1) an anchor substrate, capable of supporting an oleophilic capture substance that can complex with the target oil to permit its removal from the aqueous fluid stream; (2) an oleophilic capture substance that has affinity with the crude oil, heavy oil, hydrocarbon or other target oil, so that it complexes with it; and (3) an attachment technology that modifies the surface of the anchor substrate or otherwise attaches the oleophilic capture substance to the anchor substrate (such attachment processes being collectively termed "coating" herein, although it is recognized that a variety of surface modifications and other mechanisms may effect the attachment of the oleophilic capture substance or substances to the anchor substrate). The interaction of the anchor substrate, the capture substance and the attachment technology produces an oleophilic capture medium that can complex with the target oil, forming a removable complex that sequesters the target oil to allow for its separation from the fluid stream.

For example, the anchor substrates bearing the oleophilic capture substance can interact with oil spills on a fluid stream like the open ocean, e.g., a crude oil spill, forming therewith a removable complex that sequesters the target oil in a form that allows for its removal from the ocean ecosystem, either by flotation or by sinking. In such an embodiment, the anchor substrates could be selected to have a density that is useful for allowing the sequestered target oil to be removed effectively from the ocean ecosystem, either by flotation and subsequent removal or by sinking. In embodiments, an anchor substrate can be selected that can be supported by the surface tension of the target oil or of the fluid stream, for example a thin fibrous sheet (e.g., a paper towel or an analogous structure made with non-cellulosic fibers) or a foamed sheet, boom, or sponge, whether made from natural or artificial materials.

In embodiments, the systems and methods disclosed herein can be used for capturing and sequestering crude oil that is spilled on the surface of the ocean or other salt water body. Crude oil typically has a density that is less than that of seawater, so that it floats on the surface. In embodiments, these systems and methods provide capture media formed from attaching an oleophilic capture substance to an anchor substrate that is denser than the crude oil. The oleophilic capture coating of the capture medium interacts with the crude oil, forming a durable complex that is denser than the seawater. The capture-medium-crude-oil complex therefore sinks, sequestering the crude oil within the deeper strata of the sea, or on the bottom of the sea if the captured crude complex is of sufficient density. In embodiments, anchor substrates are selected that have sufficient density to produce removable complexes that sink to the bottom of the sea. In other embodiments, the anchor substrates are selected to have a density or other physical properties such that the removable complexes float on the surface of the fluid stream. In embodiments, these removable complexes can be physically separated from the fluid stream, thereby removing the target oil from the fluid stream. In other embodiments, the density of the anchor substrates neither predisposes the removable complexes to float nor to sink, but facilitates their separation from the fluid stream by mechanical or other separation techniques. In other embodiments, the oil containing water can be contacted with the capture medium by directing the fluid stream into contact with the capture medium, for example by directing the fluid stream into an inline mix tank containing the capture medium, or by flowing the fluid stream through a pressure vessel or other hydraulic system that contains the capture medium.

1. Anchor Substrates

As used herein, the term "anchor substrate" refers to a material that can be modified to bear on its surface an oleophilic capture substance, in accordance with the systems and methods disclosed herein. An anchor substrate can be particulate or fibrous in nature, dimensioned so as to be collected in large quantities with the target oil attached thereto. A multitude of finely dimensioned particles or fibers of anchor substrate can thus provide a large surface area for oil attachment. An anchor substrate can also be configured as a formed article, for example a solid article like a sheet, a boom, a strand, a network, a foam mass, or the like. An advantageous surface area can be provided by texturing of the surface for a large article, intertwining a plurality of strands or fibers, forming a foam mass, binding together a plurality of smaller geometric shaped articles, and the like. Composites of various anchor substrates can be fabricated that are consistent with these systems and methods.

In embodiments, anchor substrates have a density that is greater than the aqueous medium supporting the target oil. For example, anchor substrates that have a density of greater than 1.3 g/cc can be used. In embodiments, the anchor substrates may have a lower density than the fluid stream, or can have a density that is less than the density of the target oil. If the density of the anchor substrates is greater than the density of the target oil, they will facilitate sinking. In embodiments, dense particles may be selected for modification, so that they settle rapidly. In yet other embodiments, less dense or buoyant substrates may be selected for modification, so that they rise to the fluid surface after complexing with the fine particulate matter, allowing the complexes to be removed via a skimming process rather than a settling-out process, or so that they can be readily filtered out or skimmed off. In embodiments, the anchor substrates can be chosen for their low packing density or potential for developing porosity. A difference in density or particle size facilitates separating solids from the medium if the anchor substrates are dimensioned, for example, as small fibers or particles.

Suitable anchor substrates can be formed from organic or inorganic materials, or any mixture thereof. Materials suitable for use as anchor substrates can include organic or inorganic substances, or mixtures thereof. In referring to an anchor substrate, it is understood that such a substrate can be made from a single substance or can be made from a composite. For example, an anchor substrate can be formed from a substrate of one type of biomass combined with a substrate of another type of biomass. For systems where the sinking of the captured crude complexes is desirable, inorganic materials and non-biodegradable materials would be preferable, lest changes to the substrates themselves release the sequestered oil.

In accordance with these systems and methods, inorganic anchor substrates can include one or more materials such as barite, calcium carbonate, dolomite, calcium sulfate, kaolin, talc, titanium dioxide, sand, diatomaceous earth, aluminum hydroxide, silica, other metal oxides and the like. Many inorganic materials have the desired density for forming captured crude complexes that will sink. Most notable are sand, barium sulfate, gypsum, clay, calcium carbonate, ferric oxide, alumina, boron nitride, lead sulfide, and numerous other naturally occurring and man-made substances. Cost and abundance can be drivers for selection of anchor substrates.

In embodiments, ground calcium carbonate (GCC) or precipitated calcium carbonate (PCC) can be used as an anchor substrate. It can effectively attach capture substances having carboxylic acid side groups, such as styrene copolymers with carboxylic functional groups or fatty acids.

Examples of inorganic anchor substrates include clays such as attapulgite and bentonite. In embodiments, the inorganic compounds can be vitreous materials, such as ceramic particles, glass, fly ash and the like. The substrate materials may be solid or may be partially or completely hollow. For example, glass or ceramic microspheres may be used as substrates. Vitreous materials such as glass or ceramic may also be formed as fibers to be used as substrates. Cementitious materials may include gypsum, Portland cement, blast furnace cement, alumina cement, silica cement, and the like. Carbonaceous materials may include carbon black, graphite, carbon fibers, carbon microparticles, and carbon nanoparticles, for example carbon nanotubes.

In embodiments, plastic materials may be used as anchor substrates. Both thermoset and thermoplastic resins may be used to form plastic substrates. Plastic substrates may be shaped as solid bodies, hollow bodies or fibers, or any other suitable shape. Plastic substrates can be formed from a variety of polymers. A polymer useful as a plastic substrate may be a homopolymer or a copolymer. Copolymers can include block copolymers, graft copolymers, and interpolymers. In embodiments, suitable plastics may include, for example, addition polymers (e.g., polymers of ethylenically unsaturated monomers), polyesters, polyurethanes, aramid resins, acetal resins, formaldehyde resins, and the like. Addition polymers can include, for example, polyolefins, polystyrene, and vinyl polymers. Polyolefins can include, in embodiments, polymers prepared from $C_2$-$C_{10}$ olefin monomers, e.g., ethylene, propylene, butylene, dicyclopentadiene, and the like. In embodiments, poly(vinyl chloride) polymers, acrylonitrile polymers, and the like can be used. In embodiments, useful polymers for the formation of substrates may be formed by condensation reaction of a polyhydric compound (e.g., an alkylene glycol, a polyether alcohol, or the like) with one or more polycarboxylic acids. Polyethylene terephthalate is an example of a suitable polyester resin. Polyurethane resins can include, e.g., polyether polyurethanes and polyester polyurethanes. Plastics may also be obtained for these uses from waste plastic, such as post-consumer waste including plastic bags, containers, bottles made of high density polyethylene, polyethylene grocery store bags, and the like. In embodiments, elastomeric materials can be used as substrates. Substrates of natural or synthetic rubber can be used, for example.

Organic anchor substrates can include one or more materials such as starch, modified starch, polymeric spheres (both solid and hollow), and the like. For smaller-dimensioned anchor substrates, configured as fibers or particles, for example, sizes can be microscopic or submicroscopic, ranging for example from a few nanometers to few hundred microns. In certain embodiments, substrates configured as a plurality of macroscopic particles or fibers sized in the millimeter range may be suitable. In other embodiments, the anchor substrate is a macroscopic formed article, configured as one or more sheets, booms, networks, elongated fibers, geometric shapes, or any combination thereof.

In embodiments, a substrate can comprise materials such as lignocellulosic material, cellulosic material, minerals, vitreous material, cementitious material, carbonaceous material, plastics, elastomeric materials, and the like. In embodiments, cellulosic and lignocellulosic materials may include wood materials such as wood flakes, wood fibers, wood waste material, wood powder, lignins, or fibers from woody plants. Organic materials can include various forms of organic waste, including biomass and including particulate matter from post-consumer waste items such as old tires and carpeting materials.

In embodiments, fibers or fibrous materials can be used as anchor substrates. Fibers for use as anchor substrates may be provided in their natural dimensions, or they may be processed to fragment them or otherwise change their shape. Preferably, the fibers are highly expanded to maximize surface area and absorbing capacity. Fibers when used as anchor substrates can be amalgamated loosely or tightly, for example to form textiles that are woven or non-woven. Fibers suitable for use as anchor substrates can be of one or more fiber types, i.e., fibers can be natural, synthetic or artificial (i.e., semisynthetic, made by the manipulation of natural substances like cellulose to form materials not found in nature). Natural fibers can include fibers from animal sources (e.g., wool, hair, silk), fibers from plant sources (e.g., cotton, flax, jute), and fibers from mineral sources (e.g., asbestos, glass). Synthetic and semisynthetic fibers can include fibers made from polyesters, aramids, acrylics, nylons, polyurethane, polyolefin, polylactides, and the like. In embodiments, semisynthetic fibers can include fibers made from cellulose substrates, for example cellulose esters (e.g., cellulose acetate), rayon, bamboo fiber, lyocells, viscose rayon, and the like.

Anchor substrates can be selected from biomass, for example, so that they complex with the target oil to form a biomass-oil composite solid. Biomass can be derived from vegetable sources or animal sources. Biomass can be derived from waste materials, including post-consumer waste, animal or vegetable waste, agricultural waste, sewage, and the like. In embodiments, the biomass sourced materials are to be processed so that they form anchor substrates of an appropriate size for tethering and combining with the target oil. Substrate sizes of, e.g., 0.01-50 millimeters can be used. Long, narrow fibers are another desirable form. Processing methods can include grinding, milling, pumping, shearing, and the like. For example, hammer mills, ball mills, and rod mills can be used to reduce oversized materials to an appropriate size. In embodiments, additives might be used in the processing of the anchor substrates to improve efficiency, reduce energy requirements, or increase yield. These processing additives include polymers, surfactants, and chemicals that enhance digestion or disintegration. Optionally, other treatment modalities, such as exposure to cryogenic liquids (e.g., liquid nitrogen or solid carbon dioxide) can be employed to facilitate forming anchor substrates of appropriate size from biomass. It is understood that biomass-derived anchor substrates can be formed as substrates of any morphology (regular or irregular, plate-shaped, flakes, cylindrical, spherical, needle-like, etc.) or can be formed as fibers. Fibrous materials may be advantageous in that they facilitate dewatering/filtration of the composite material being formed by these systems and methods, and they can add strength to such composite materials. Fibrous materials have the added advantage of the ability to form the material into shapes that enable distribution, sorption, and collection of oil.

Vegetable sources of biomass can include fibrous material, particulate material, amorphous material, or any other material of vegetable origin. Vegetable sources can be predominately cellulosic, e.g., derived from cotton, jute, flax, hemp, sisal, ramie, and the like. Vegetable sources can be derived from seeds or seed cases, such as cotton or kapok, or from nuts or nutshells. Vegetable sources can include the waste materials from agriculture, such as corn stalks, stalks from grain, hay, straw, or sugar cane (e.g., bagasse). Vegetable sources can include leaves, such as sisal, agave, deciduous leaves from trees, shrubs and the like, leaves or needles from coniferous plants, and leaves from grasses. Vegetable sources can include fibers derived from the skin or bast surrounding the stem of a plant, such as flax, jute, kenaf, hemp, ramie, rattan, soybean husks, vines or banana plants. Vegetable sources can include fruits of plants or seeds, such as coconuts, peach pits, mango seeds, and the like. Vegetable sources can include the stalks or stems of a plant, such as wheat, rice, barley, bamboo, and grasses. Vegetable sources can include wood, wood processing products such as sawdust, and wood, and wood byproducts such as lignin.

Animal sources of biomass can include materials from any part of a vertebrate or invertebrate animal, fish, bird, or insect. Such materials typically comprise proteins, e.g., animal fur, animal hair, animal hoofs, and the like. Animal sources can include any part of the animal's body, as might be produced as a waste product from animal husbandry, farming, meat production, fish production or the like, e.g., catgut, sinew, hoofs, cartilaginous products, etc. Animal sources can include the dried saliva or other excretions of insects or their cocoons, e.g., silk obtained from silkworm cocoons or spider's silk. Animal sources can include dairy byproducts such as whey, whey permeate solids, milk solids, and the like. Animal sources can be derived from feathers of birds or scales of fish.

Anchor substrate sizes (as measured as a mean diameter) can have a size up to few hundred microns, for example a size greater than about 70 microns. In certain embodiments, macroscopic anchor substrates up to and greater than about 1 cm may be suitable. In the case of fibrous anchor substrates, the length of the fibers can be significantly greater than the diameter. In embodiments, the fibers can be formed into a continuous shape such as a roll, pad, rope, pompom, pillow, blanket, net, and the like.

In other embodiments, anchor substrates comprising materials such as those disclosed above can be fabricated as formed articles. For example, a plurality of fibers can be formed as a sheet having large dimensions relative to the size of the component fibers. As an example, a paper sheet or paper towel can be formed to act as an anchor substrate, or an analogous article can be formed from non-cellulosic fibers. As another example, a foamed article, such as a boom or a natural or artificial sponge, can be formed as an anchor substrate, with dimensions suitable for the mass of oil to be removed. A foamed article can be of relatively large dimensions, or it can be broken down into foam pieces which act as anchor substrates. Formed substrates comprising anchor substrates can be configured and arranged as filters or screens to be used for in-line fluid processing. Such objects, while suitable for in-line fluid processing where a fluid stream is directed to contact them, can also be deployed upon an open body of water to reach a target oil contained therein. Formed substrates can be configured as elongated masses or intertwined masses of fibers, where the fibers can be of any suitable dimension for their deployment. As examples, the fibers can be extremely long in comparison to their cross-sectional diameter. The fibers can be of macroscopic dimensions in length, width, or both. The fibers can be intertwined or otherwise interacting with each other, formed as swabs, pompoms, "cotton balls," and the like. Other shapes, configurations, compositions, and uses of anchor substrates as formed articles will be readily apparent to those of ordinary skill in the art.

2. Oleophilic Capture Substances

A number of hydrophobic (generally organic) materials can be attached to anchor substrates as capture coatings that can interact with the target oil to complex it. In embodiments, examples of capture substances include water-insoluble coatings such as waxes, paraffins, oils, crude oil, mineral oil, rosin, fatty acids, triglycerides, asphaltenes, latex rubber, rubber cement, and the like. In embodiments, examples of capture substances also include other hydrophobic species such as naphthenic acid, aromatic carboxylic acid compounds, benzoic acid, the Jeffamines, and the like. In embodiments, examples of capture substances are non-polar polymers such as polyolefins, polyethylene, polypropylene, SBR, polyisobutylene, polyisoprene, polybutadiene, styrenics and copolymers, and chitosan can be used.

Capture substances that can be attached covalently to anchor substrates include trimethylchlorosilane and other organosilane quaternary compounds (e.g., the Aegis Microbe "sword" compound). Other covalently attached capture substances include alkylketene dimers and alkenylsuccinic anhydrides. Polymers that can act as capture substances include styrene maleic anhydride polymers, styrene-maleic anhydride imide polymers, styrene-butadiene rubber copolymers, polyisoprene, styrene-isoprene, styrene-butadiene-styrene bloc copolymers, polyisobutylmethacrylate, polyisobutylmethacrylate/linseed oil, alkyl acrylate copolymers, styrene maleimide (SMA imide) resins, and the like. Cationic resins can be effective as capture substances due to their charge, which has affinity for anchor substrates like cellulose acetate.

When anchor substrates are selected that are intrinsically hydrophilic, there is the risk that they will absorb water from the aqueous environment even as they support the oleophilic capture substances that are absorbing oil. Hence, in embodiments, it is desirable to treat hydrophilic anchor substrates with a substance that renders them less hydrophilic. In embodiments, such treatment can be carried out using a single oleophilic capture substance: the oleophilic capture substance can render the anchor substrates hydrophobic while at the same time allowing the treated anchor substrates to absorb the oil. In other embodiments, two or more different treatments are required, one that is more advantageous for rendering the anchor substrates hydrophobic, and one that is more advantageous for attaching an oleophilic capture substance to the anchor substrates. In embodiments, the hydrophobic treatment may not increase the oil absorbing capacity of the substrate, but can decrease the water absorbing capacity. This lowered water absorbing capacity can enable the material to more selectively absorb oil.

3. Attachment Technologies

A number of technologies can effect the attachment or coating of the anchor substrates with the oleophilic capture substance to produce removable complexes. The selection of attachment technology can depend upon the nature of the capture substance and the nature of the anchor substrate. The term "attach" refers to a coupling between entities, here the capture substance and the anchor substrate. Such a coupling can be direct, as with a covalent chemical bond being formed between the capture substance and the anchor substrate, or it can be indirect, where an intermediary agent (e.g., a bifunctional coupling agent) bonds both to the anchor substrate and the capture substance. Attachment between the anchor substrate and the capture substance can occur by any feasible mechanism consistent with an embodiment of the invention. As examples, non-limiting mechanisms by which anchor substrates and capture substances can be bound together can include covalent bonding, non-covalent bonding, electrostatic (or ionic) forces, Van der Waals forces, hydrogen bonding, surface coating, other intermolecular forces, and combinations of the listed mechanisms. Other, mechanical mechanisms for attaching the capture substances to the anchor substrate include precipitation, spray deposition, evaporation, adsorption, layer-by-layer deposition, and the like.

In an embodiment, to effect attachment of a capture substance to an anchor substrate, a dilute solution of a hydrophobic material can be used. Examples of such hydrophobic materials suitable for capture substances include, but are not limited to, naphthenic acid, asphaltene, rubber cement, hydrophobic starch, non-polar polymers (such as olefins, SBR, polyisobutylene, polyisoprene, polybutadiene, styrenics and copolymers), and chitosan.

In embodiments, chitosan can be attached to anchor substrates by pH titration: it can be dissolved in water under acidic conditions and exposed to the anchor substrates. As the pH of the chitosan solution is increased, the chitosan can precipitate out of the solution onto the surface of the anchor substrates, forming a near-monolayer coating on the anchor substrates that can act as a capture substance. In other embodiments, styrene maleimide copolymers can be used as capture substances, being attachable to anchor substrates by pH titration. For styrene maleimide copolymers, as the pH of the solution increases, they can precipitate out of the solution, forming a near-monolayer coating on the anchor substrates that can act as a capture substance.

In other embodiments, a hydrophobic capture substance can be dissolved in an appropriate solvent (e.g., Isopar, acetone, alcohols, alkanes, or any mixtures thereof, and the like). The substrate material(s) can be dipped in the solution and removed, bearing the capture substance on the surfaces. Or the solution containing the dissolved capture substance can be sprayed onto the anchor substrates. Upon drying, the substrates become coated with the capture substance. In embodiments, the drying process can be accelerated by heating or vacuum exposure. In other embodiments, the hydrophobic substance can be applied as a concentrated or solvent-free liquid, in the form of an aerosol or spray application. Solid hydrophobic modifiers can be attached by mixing followed by heating to melt the solid material onto the surface of the substrate. In embodiments, the substrate material can be treated with capture material in a continuous process, such as on a continuous ribbon blender, a pug mill, or a conveyor belt.

In embodiments, an anchor substrate can be prepared to capture target oils, for example, by using sand as an anchor substrate, and attaching to it low levels (about 2.0%) of oleophilic capture substances selected from the group consisting of asphaltene, diluted heavy crude oil, chitosan, chitosan with a glycidyl hexadecyl ether modifier, wax, Aegis Microbe sword compound, lignin-organosolv, styrene butadiene rubber, polyisoprene, styrene/isoprene, styrene maleic acid, SEB/MA, polyisobutylmethacrylate, lauryl acrylate, linseed oil, and the like. In embodiments, calcium carbonate can be used as an anchor substrate, with a capture substance attached to it that is selected from the group consisting of fatty acids, naphthenic acids, and the like. In embodiments, the capture particles can be in the form cellulose ester fibers such as cellulose acetate can be treated with oleophilic capture substances, for example by spraying, by evaporation, or by dissolving the hydrophobic substances into the cellulose acetate solution before forming the fibers. In other embodiments, the cellulose acetate fibers can be formed according to standard industrial practices, followed by treatment with a hydrophobic agent. This hydrophobic agent can be in the form of a solid, powder, emulsion, dispersion, solution, or aerosol.

4. Exemplary Applications

To treat an aqueous surface covered with floating oil, a sufficiently large number of capture particles should be brought into contact with the target oil so that it can be captured and sequestered. For example, a layer of crude oil on the surface of the ocean would be treated with capture particles to form removable complexes. Depending upon the density of the anchor substrates that comprise the capture particles, the removable complexes can float on the surface of the ocean to be skimmed off or scooped up, or the removable complexes can sink to the bottom of the ocean to reside there indefinitely. Density of the anchor substrates can be selected to arrange any appropriate destination of the removable complexes at different ocean depths.

In embodiments, large contaminated areas of water can be treated by dispersing the capture medium in particulate form widely and efficiently, as could be accomplished by aerial sprinkling (like crop dusting) or spraying from planes, helicopters, or surface vessels. The capture medium can complex rapidly with the target oil and, with appropriate density, can sink. For heavy crude oil, its high viscosity can assist in this "densifying" or "weighting" process, as the removable complexes do not easily detach from the rest of the target oil blobs. Since the density difference between sea water and oil/crude is small to begin with, a small amount of attachment to or integration with the capture medium can lead to flipping of the tendency from "float" to "sink" for an entire oil mass, thereby effecting a settling of a larger area of the oil blob and removing it from the water surface. Sinking the oil blobs through formation of removable complexes can prevent them from being carried further by ocean currents, which would otherwise allow them to contaminate remote areas.

In embodiments, compositions can be prepared that can sequester an oil mass into a floating composite. Such floating compositions can comprise an anchor substrate bearing an oleophilic capture substance, or compositions can comprise anchor substrates without coatings that are then mixed with one or more oleophilic capture substances. Contacting the oil mass with the floating compositions can sequester the oil by absorbing it onto the anchor substrates, where the anchor substrates are designed to float on the surface of the water.

Other technologies can be combined with the use of the capture media to further prepare the oil for capture. For example, coalescence technologies can be employed to increase the coalescence of the dispersed oil droplets in the aqueous medium, making it easier to attach masses of target oil to the capture media. In other embodiments, dispersion or emulsion technologies can be used to break up masses of target oil so that it can attach more readily to certain target media. Deployment of the capture media can take place following these adjunctive technologies, or simultaneous therewith. Deployment, as would be understood in the art, involves a variety of mechanisms to bring the capture medium into contact with the target oil. Deployment mechanisms can include spraying, spreading, stirring, injecting, dumping, broadcasting, spilling, shooting, casting, throwing, and the like, with the mechanism being selected that is appropriate to the size and shape of the capture medium and the size, shape, consistency and location of the target oil, all as would be appreciated by those of ordinary skill in the art. In embodiments, the capture medium can be prepared before deployment. In other embodiments, the capture medium can be formed at the same time as the deployment. In yet other embodiments, the anchor substrate can be deployed first, then combined with the modifier technology. In such embodiments, the modifier technology is deployed as would be appropriate for its physical configuration.

In other embodiments, capture media configured as larger-scale formed articles such as sheets, booms, networks, fiber masses, geometric objects or the like can be deployed onto or within a region of target oil. For example, capture media shaped as a sheet can "blot" up oil from an aqueous surface. As another example, capture media formed into networks with fine interstices can be used to filter oil from an aqueous stream or vessel. Capture media formed into fiber masses can offer a large surface area for the complexation of target oil, so that the entire mass can be removed as a unit. Texturing of the larger-scale solid anchor substrates can be engineered to increase surface area for complexation.

In embodiments, anchor substrates or substrate types useful for sequestering oil into floating composites in accordance with these systems and methods can be prepared from organic or inorganic materials. In embodiments, the anchor substrates can have a density of between 0.1 and 1.0 g/cc. In other embodiments, anchor substrates can be selected with a density that does not lead to the sequestration of target oil into floating composites, but still yields a mass of removable complexes that can be separated from the fluid stream by mechanical or other familiar separation techniques, such as skimming, filtration, vacuuming, segregation, or other techniques familiar in the art for removing particulate matter from fluids.

A variety of natural or synthetic organic materials are suitable as anchor substrates without limitation, with examples as disclosed above. For further exemplification, anchor substrates can include, in embodiments, cellulosic plant matter (such as peat, bagasse, leaf particles, husks, grasses, hay, straw, bark, lignocellulose products, and the like), plant/cereal seed matter (such as rice, corn, soybeans, wheat, barley, oats, sorghum, rye, buckwheat, and the like), plant/nut shells (such as peanuts, walnuts, pecans, and the like), animal matter (such as feathers, scales, fur, hair, and the like), synthetic organic matter (such as plastic scrap, crumb rubber and the like), or inorganic matter (such as char, ash, pumice, vermiculite, perlite, attapulgite, zeolite, diatomaceous earth, and the like). Formulations comprising anchor substrates can include mixtures of different types of anchor substrates. The substrates for anchor substrates can be processed, without limitation, by a variety of techniques familiar in the art, such as drying, grinding, milling, size classification, washing, expanding, and the like.

In embodiments, a fibrous anchor substrate like cellulose acetate can be advantageously used as an anchor substrate. Fibers, e.g., cellulose acetate, can be constructed into sheets, booms, webs, lattices, or other arrangements that are suitable, either before or after treatment with oleophilic capture substances as described below. In embodiments, lattice-forming fibers, e.g., cellulose acetate, can be deployed as continuous bands or as a fibrous sheet. In embodiments, the cellulose acetate is deployed in a form that is highly expanded, to allow for a highly lofted, low density, expanded material. Hence, the retrieval of oil from fluid streams can be simplified: instead of picking up agglomerations of particles, for example, a retrieval system can pull up a continuous ribbon or a fibrous sheet. Fibrous anchor substrates that are treated with oleophilic capture substances can also be deployed in other suitable arrangements for capturing oil from fluid streams, including pompoms, brooms, mops, and the like. In other embodiments, the anchor substrates treated with oleophilic capture substances can be used as filler or "stuffing" for other porous containers such as pillows, booms, pads, socks, blankets, and the like that come in contact with oil in aqueous environments. Used in this way, the treated anchor substrates can adsorb the oil while the pillows, booms, etc. act as mechanical barriers that confine the oil and thereby facilitate its capture.

Anchor substrates modified with or combined with oleophilic capture substances form compositions that can sequester an oil mass. Combining or modifying an anchor substrate with an oleophilic capture substance can render an otherwise hydrophilic anchor substrate (e.g., hay, bagasse, and the like) hydrophobic. Thus, the anchor substrate prepared in accordance with these systems and methods can absorb less water than the unmodified substance, so that collection of the target oil captured in the removable complex will be facilitated and waste volume will be minimized due to the low amount of water that is entrapped.

Oleophilic capture substances for use with anchor substrates can comprise hydrophobic materials that can be coated onto the anchor substrates or that can be mixed in with the anchor substrates. One or more oleophilic capture substances can be used in a composition with one or more anchor substrates. The oleophilic capture substances can be used as coatings, used as components of mixtures, or any combination thereof. Oleophilic capture substances can be selected to support the desired physical properties of the anchor substrates. For example, oleophilic capture substances to be used for floating purposes support the buoyant nature of the anchor substrates.

Examples of oleophilic capture substances suitable for use in accordance with these systems and methods include polymers and copolymers of styrene, butadiene, isoprene, acrylate esters, propylene, ethylene, and the like. Further examples of oleophilic capture substances suitable for use in accordance with these systems and methods include thermoplastics like acrylonitrile butadiene styrene, ethylene vinyl acetate, polyacrylonitrile, polyethylene terephthalate, nylon, polyvinyl chloride, polyvinyl alcohol, and the like. Yet other examples of oleophilic capture substances suitable for use in accordance with these systems and methods include elastomers like rubber, polyisoprene, polybutadiene, and the like. Further examples of oleophilic capture substances suitable use in accordance with these systems and methods include waxes (e.g., paraffin, plant wax, beeswax), resins, tree resins, rosin, sap, vegetable oils, and the like. Additional examples of oleophilic capture substances suitable for use on accordance with these systems and methods include fatty acids, e.g., in the C12-C30 range, for example, stearic acid, oleic acid, blends of fatty acids, and esters, amides and glycerides thereof, and the like. Yet other examples of oleophilic capture substances suitable for use in accordance with these systems and methods include oils such as crude oil, bitumen, slack wax, mineral oil or asphalt, and the like. Further examples of oleophilic capture substances suitable for use in accordance with these systems and methods these purposes include hydrophobic starches. Additional examples of oleophilic capture substances suitable for use in accordance with these systems and methods include sizing agents such as alkenylsuccinic acid anhydride, alkylketene dimer, rosin, and the like.

Oleophilic capture substances can be combined with the chosen anchor substrate(s) using appropriate processes for producing mixtures, coated particles or other compositions, including dry blending or milling, wet blending or milling, coextrusion, spray drying, and the like. In embodiments, the anchor substrates can be coated with a solution of the oleophilic capture substance, followed by the removal of the solvent, resulting in anchor substrates bearing the oleophilic capture substance as a coating. In embodiments, the anchor substrates can be coated with a liquid or molten form of the oleophilic capture substance. In embodiments, the anchor substrates can be exposed to a foamed composition of the oleophilic capture substance, so that the capture substance comes to reside on the anchor substrates.

In embodiments, compositions in accordance with these systems and methods can be applied to target oil masses using a variety of technologies, as would be appreciated by those of ordinary skill in the art. The compositions can be prepared in loose granular form, suitable for sprinkling, spraying, or other mass dispersion methods. The compositions can be exposed to the target oil masses using aerial dispersion (e.g., cropdusting) techniques, spraying techniques, mixing techniques, or can be delivered by pressure, propulsion or explosion into the fluid stream. The compositions can also be incorporated into other delivery systems. For example, the floating compositions can be supported or delivered in the form of booms, socks, pads, nets, filters, or other composite materials for which they can comprise the active ingredients.

In other embodiments, compositions in accordance with these systems and methods can be made using an appropriate anchor substrate, such as cellulose acetate fibers, that has been modified to remove other organic materials from a fluid stream. The modified fibers can be formed into a suitable geometry, for example as a filtration product, as a sheet, as a loose collection of fibers, as a slurry, or the like. The organic contaminants, including but not limited to oily materials, can contact the modified fiber assemblage for removal. In embodiments, for example, hydrophobically modified anchor substrates (e.g., cellulose acetate) can be made by coating or modifying the anchor substrates or fibers with hydrophobic polymers, fatty acids, waxes, and the like. Such materials can be used for removing organic substances from fluid streams, including but not limited to oily materials. For example, water soluble or other organic materials or nutrients imposing biochemical or chemical oxygen demand on a water stream can be removed using these systems and methods. Aggregations of modified anchor substrates in accordance with these systems and methods are suitable for use with a variety of fluid streams, such as those found in water for hydraulic fracturing, bilge water, produced water from oil and gas operations, refinery effluents, paint waste, removal of oily mist from gas streams like compressor exhaust, emulsion breaking, coalescing, and the like.

Modified anchor substrates or fibers can be arranged in any suitable geometric shape, and can be deployed within a device specifically adapted for removing contaminants from the fluid stream. As an example, cellulose acetate fibers modified in accordance with these systems and methods can be arranged as a component of a flow through filter cartridge for removing hydrophobic organic contaminants from a fluid stream. The filter cartridge containing the removed organic components, sequestered by the removable complexes with the anchor substrates, can be disposed of by incineration, for example.

In embodiments, removable complexes as described herein can be further processed following their removal. For example, the removable complexes can be processed to allow the separation of the oil contained therein from the capture medium. In embodiments, the capture medium can be reused following the release of the entrapped oil, while in other embodiments, the capture medium is disposed of. In embodiments, the removable complexes as described herein can be incinerated to destroy the remaining oily substance.

EXAMPLES

Example 1

Sand-Silane Modification

A modified sand capture particle was prepared using 20 gms of sand (white quartz, Aldrich, 50-70 mesh) as the anchor substrate combined with 20 gms of a 6.9% Silane 9-6346 solution as the oleophilic coating. To prepare the Silane solution, Dow Corning Silane 9-6346 (72% in methanol) was dissolved in a 95:5 mixture by volume of ethanol with water. The pH was adjusted to 5.41 with acetic acid. The solution was continuously stirred at room temperature for one hour. After preparation, 20 gms of sand was added to 20 gms of the Silane solution and soaked for 30 minutes, with the solvent then rotary-evaporated to produce modified sand capture particles. The modified sand was cured in an oven at 110° C. for 15 minutes. The cured sand was rinsed with deionized water three times and filtered through 45 micron size filter paper. The modified sand was then dried at 110° C. for one hour.

Example 2

Sand Modified with Poly(Styrene Ethylene Butylene)

A polymer solution of poly(styrene ethylene butylene) was prepared by dissolving 0.2 gm of the polymer (Kraton) in 20 ml toluene. 20 gms of sand (white quartz, Aldrich, 50-70 mesh) were used as the anchor substrate. The sand was combined with the polymer solution and mixed for 10 minutes. The solvent was removed by rotary-evaporation.

Example 3

Sand Modified with Organosolv Lignin

A solution of organosolv lignin was prepared by dissolving 0.4 gm of organosolv lignin (Aldrich) in 20 ml acetone. 20 gms of sand (white quartz, Aldrich, 50-70 mesh) were used as the anchor substrate. The sand was combined with the organosolv lignin solution and mixed for 10 minutes. The solvent was removed by rotary-evaporation.

Example 4

Sand Modified with Paraffin Wax

A solution of paraffin wax was prepared by dissolving 0.4 gm of paraffin (Aldrich, melting point 65° C.) in 20 ml heptane. 20 gms of sand (white quartz, Aldrich, 50-70 mesh) were used as the anchor substrate. The sand was combined with the paraffin solution and mixed for 10 minutes. The solvent was removed by rotary-evaporation.

Example 5

Sand Modified with Chitosan 0.6 gm of acetic acid and 100 gm of water were combined in a beaker. 0.5 gm of chitosan (Chitoclear cg 800, Primex, Iceland) was added to the solution and stirred until it dissolved. 5 gm of sand (white quartz, Aldrich, 50-70 mesh) was added to the chitosan solution. This mixture was stirred, and the pH was slowly increased to ~pH8 by adding 5M NaOH. The precipitated solid was filtered by gravity, washed with deionized water, and dried under a vacuum at 70° C. for one hour.

Example 6

Deposition of Asphaltene on Sand 20 g of Sand (white quartz, Aldrich, 50-70 mesh) was mixed with 70 g of heavy oil (API=10, Viscosity=40,000 cps at RT). The mixture was heated at 80° C. for 15 minutes while stirring. To this mixture was added approximately 650 ml of heptane. Next the solid was separated by gravity filtration, washed 3 times with 20 ml of heptane and dried under vacuum at 70° C. for 1 hour.

Example 7

Deposition of Crude Oil on Sand

A solution of heavy crude oil (API=10, Viscosity=40,000 cps at room temperature) in toluene was prepared by dissolving 2 g of the heavy oil in 70 g of toluene. 0.76 g of this solution was weighted and further diluted by adding 20 ml of toluene. Next, 10 g of sand (white quartz, Aldrich, 50-70 mesh) was added to the solution. The solvent was evaporated by rotary-evaporation and the obtained solid was dried under vacuum at 70° C. for 1 hour.

Example 8

Deposition of Oleic Acid on Calcium Carbonate 0.2 gm of oleic acid (Aldrich) was dissolved in approximately 35 ml of toluene. To this solution was added 10 g of Precipitated Calcium Carbonate (Specialty Materials, Bethlehem Pa.). The mixture was shaken vigorously in an orbital mixer for 15 minutes. Next the solvent was evaporated by rotary-evaporation and the obtained solid was dried under vacuum at 70° C. for 1 hour.

Example 9

Deposition of Naphthenic Acid on Calcium Carbonate 15 gm of naphthenic acids (Aldrich, acid number 230) was added to 400 ml Isopar M (Exxon Mobile) in a 500 ml Nalgene bottle. Next, 25 g of precipitated calcium carbonate was added and the whole mixture was agitated in an orbital shaker (200 rpm) overnight. The sample was centrifuged at 1,500 rpm for 5 minutes to separate the solid from liquid. The solid was dried under vacuum at 70° C. for 1 hour.

Example 10

Preparation of Synthetic Seawater Solution

Microprocessed scientific grade marine salt mix (Coralife, Franklin Wis.) was used to prepare 5 gallons of synthetic seawater by following the instructions provided by the manufacturer (i.e., mixing sea salt in an appropriate amount of tap water (about ½ cup sea salt per gallon water), then obtaining the appropriate amount of salinity by adjusting solution strength to a specific gravity of 1.022 g/cc using a hydrometer).

Example 11

Oil Clean-Up Test 10 ml of synthetic seawater prepared in accordance with Example 10 and 0.11 ml crude oil (API 37) were mixed in a 20 ml. scintillation vial. The oil was then allowed to form a film on the surface of the water sample. 0.4 gm. of a sand sample were added to the sea water/oil solution and agitated for 5 seconds. The vial was then left to settle. Sand samples modified in accordance with Examples 1, 4, 5, 6, and 7 were used as test samples, and unmodified sand (white quartz, Aldrich, 50-70 mesh) was used as the control. Untreated sand trapped some oil droplets when settling to the bottom. Modified sand absorbed more oil before settling out. When compared to the control test using the unmodified sand, the use of modified sand removed more oil from the sample.

Example 12

Microscopy of the Settled Sand Bed

The sand beds produced by the experiments of Example 11 were observed under the microscope at 50× magnification. The sand beds using the unmodified sand showed some trapping of oil droplets. The sand beds using the unmodified sand showed large agglomerates of sand surrounded with an oil coating.

Example 13

Preparation of Floating Composition

A blend of bagasse, stearic acid, and paraffin wax (50:25:25 ratio) was prepared and this was ground up using a blender. This composition is capable of floating on an aqueous surface.

Example 14

Preparation of Floating Composition

A blend of bagasse, stearic acid, and paraffin wax (20:40:40 ratio) was prepared and this was ground up using a blender. This composition is capable of floating on an aqueous surface.

Example 15

Preparation of Floating Composition

A blend of bagasse and bitumen (80:20 ratio) was prepared by mixing. This composition is capable of floating on an aqueous surface.

Example 16

Preparation of Floating Composition

A blend of bagasse and paraffin wax (80:20 ratio) was prepared by heating these materials above the melting point of the wax (65 C) and then mixing them together.

Example 17

Formation of Floating Removable Complex with Crude Oil

Synthetic seawater prepared in accordance with Example 10 was placed in a 1 liter beaker with stir bar at room temperature and 3 grams of crude oil (30 API gravity) were added, forming a layer of oil on the aqueous surface. 3 gm of the composition prepared in accordance with Example 13 was added to the oil layer. It was observed to absorb the oil into a solidified floating mass. The mass was removed from the surface of the water by mechanical screening methods. For comparison, a sample of crude oil without the additive could not be removed from the water surface using mechanical screening. This test demonstrated the formation of a floating removable complex that could be readily collected. In other examples, the removable complex can be captured by other mechanical means, for example by a raking action.

Example 18

Formation of Removable Complex with Crude Oil

Synthetic seawater prepared in accordance with Example 10 was placed in a 1 liter beaker with stir bar at room temperature and 3 grams of crude oil (30 API gravity) were added, forming a layer of oil on the aqueous surface. 3 gm of the composition prepared in accordance with Example 14 was added to the oil layer. It was observed to absorb the oil into a solidified floating mass. The mass was removed from the surface of the water by mechanical screening methods. For comparison, a sample of crude oil without the additive could not be removed from the water surface using mechanical screening. This test demonstrated the formation of a floating removable complex that could be readily collected. In other examples, the removable complex can be captured by other mechanical means, for example by a raking action.

Example 19

Comparison of Treated and Untreated Bagasse

The wax/bagasse blend of Example 16 was added to the synthetic seawater prepared in accordance with Example 10.

There was no evidence of wetting for this substance, indicating that the wax/bagasse blend was hydrophobic. In a comparative experiment, unmodified bagasse fibers were added to the synthetic seawater preparation, and they became wetted in less than 5 minutes, indicating that the untreated fibers are hydrophilic.

Example 20

Preparation of a Floating Composition

A blend of bagasse, stearic acid, and paraffin wax can be prepared in a 90:5:5 ratio. This blend can be ground up using a blender.

Example 21

Preparation of a Floating Composition

A blend of bagasse and stearic acid can be prepared in a 95:5 ratio. This blend can be ground up using a blender.

Example 22

Preparation of a Floating Composition

Bagasse can be treated with an aqueous emulsion of wax in a 90:10 ratio of bagasse to wax. This mixture can be dried to form a coated product.

Example 23

Preparation of a Floating Composition

Dried hay can be treated with a liquid fatty acid mixture in an 80:20 ratio.

Example 24

Preparation of a Floating Composition

Sawdust can be treated with a solution of paraffin wax in volatile organic solvent. After evaporation of the solvent, the ratio of sawdust to wax can be 90:10.

Example 25

Preparation of a Floating Composition

Feathers can be treated with EVA polymer in liquid emulsion form. The mixture, once dried, would be ready to use for the formation of a removable complex with a target oil.

Example 26

Formation of Removable Complex with Crude Oil

Synthetic seawater prepared in accordance with Example 10 can be placed in a 1 liter beaker with stir bar at room temperature, and 3 grams of crude oil (20 API gravity) can be added, forming a layer of oil on the aqueous surface. 3 gm of the composition prepared in accordance with Example 13 can be added to the oil layer to absorb the oil into a solidified floating mass. This crude oil is a simulation of partially evaporated crude oil. The complex formed with the target crude oil can be removed from the surface of the water by mechanical screening methods. For comparison, a sample of crude oil without the additive would not be removed from the water surface using mechanical screening.

Example 27

Formation of a Removable Complex with Crude Oil

Synthetic seawater prepared in accordance with Example 10 can be placed in a 1 liter beaker at room temperature, and 3 grams of crude oil (30 API gravity) can be added. With intense mixing, the crude oil can be emulsified in the water, and the emulsion layer can float on the surface of the seawater. 3 gm of the composition prepared in accordance with Example 14 can be added to the oil layer, with the absorption of the oil into a solidified floating mass. The mass can be removed from the surface of the water by mechanical screening methods. For comparison, a sample of emulsified crude oil without the additive would not be removable from the water surface using mechanical screening.

Example 28

Preparation of Cellulose Acetate Substrate

Cellulose acetate fibers were obtained from "Filter Tips" (manufactured by TOP Tobacco L.P., Spain) by removing the paper that surrounded the fibrous filters and grinding the filter fibers in a blender for about 1 minute.

Example 29

Coating Cellulose Acetate Fibers with Oil (Samples AM1, AM2, and AM3)

Samples of oil-coated cellulose acetate fibers were prepared by using three different oils as coatings: Sample AM1 used a cooking grade vegetable oil coating from Shaw's Supermarket, Sample AM2 used a medium grade crude oil coating, and Sample AM3 used a mineral oil from CVS Drugstore. To prepare each oil-coated cellulose acetate fiber sample, 0.025 gm of the oil for coating was dissolved in 50 ml. of hexane; 2.5 gm of cellulose acetate fibers prepared in accordance with Example 28 were added to this solution and the mixture was stirred manually for 5 minutes. The solvent was then evaporated in the rotary evaporator, and the obtained solid was dried under vacuum at 70° C.

Example 30

Coating Cellulose Acetate Fibers with PolyDADMAC and Stearic Acid (Sample AM4)

3 gm of cellulose acetate fibers prepared in accordance with Example 28 were added to a solution of 0.45 g of a 20 wt % water solution of poly(diallyldimethylammonium chloride) (polyDADMAC, Aldrich), 15 g of DI-water and 35 ml of isopropanol (Aldrich). After the mixture was stirred manually for 5 minutes, an additional 40 ml of isopropanol was added, and the mixture was stirred for another 5 minutes. In a separate beaker, a solution was prepared that included 0.475 gm of stearic acid (JT Baker) dissolved in 20 gm of water containing 0.33 gm of NaOH 5M and 20 ml. isopropanol. The cellulose acetate fiber mixture was added to this solution while stirring vigorously. The liquid was then filtered off by gravity and the fibers were dried under vacuum at 70° C.

Example 31

Coating Cellulose Acetate Fibers with PolyDADMAC, Stearic Acid, Mineral Oil (Sample AM5)

3 gm of cellulose acetate fibers prepared in accordance with Example 28 were added to a solution of 0.45 g of a 20 wt % water solution of polyDADMAC, 15 g of DI-water and 35 ml of isopropanol (Aldrich). After the mixture was stirred manually for 5 minutes, an additional 40 ml of isopropanol was added, and the mixture was stirred for another 5 minutes. In a separate beaker, a solution was prepared that included 0.475 gm of stearic acid (JT Baker) dissolved in 20 gm of water containing 0.33 gm of NaOH 5M, 20 ml. isopropanol, and 0.3 gm mineral oil (from CVS Drugstore). The cellulose acetate fiber mixture was added to this solution while stirring vigorously. The liquid was then filtered off by gravity and the fibers were dried under vacuum at 70° C.

Example 32

Coating Cellulose Acetate Fibers with polyDADMAC, Stearic Acid and Benzoic Acid (Sample AM6)

3 gm of cellulose acetate fibers prepared in accordance with Example 28 were added to a solution of 0.45 g of a 20 wt % water solution of polyDADMAC, 15 g of DI-water and 35 ml of isopropanol (Aldrich). After the mixture was stirred manually for 5 minutes, an additional 40 ml of isopropanol was added, and the mixture was stirred for another 5 minutes. In a separate beaker, a solution was prepared that included 0.2375 gm of stearic acid (JT Baker) dissolved in 20 gm of water containing 0.33 gm of NaOH 5M, 20 ml. isopropanol, and 0.102 gm benzoic acid (Aldrich). The cellulose acetate fiber mixture was added to this solution while stirring vigorously. The liquid was then filtered off by gravity and the fibers were dried under vacuum at 70° C.

Example 33

Coating Cellulose Acetate Fibers with Stearic Acid (Sample AM7)

0.475 g of stearic acid was dissolved in 20 g of DI-water containing 0.33 g of NaOH (5 M) and 20 ml of isopropanol. 3 g of the cellulose acetate fibers prepared in accordance with Example 28 were added to the solution and the whole mixture was stirred manually for 5 minutes. A few drops of HCL (37 wt %) were added to the mixture to decrease its pH to approximately 2. Next the liquid was filtered off by gravity and the fibers were dried under vacuum at 70° C.

Example 34

Preparing Polyethylene-Coated Cellulose Acetate Fiber Bundles (Sample AM8)

Cellulose acetate fiber bundles were prepared from cigarette filters ("Filter Tips" manufactured by TOP Tobacco L.P., Spain) by removing the paper that surrounded the fibrous filters and cutting the tips into 3-4 mm long small cylindrical-shaped bundles having an 8 mm diameter. 2.6 gm cut filter bundles were dipped into 10% Michem Emulsion 39235 (high density polyethylene emulsion, from Michelman). Excess liquid was decanted. The add-on weight of Michem Emulsion 39235 to the dry weight of filter bundles was 81%. Samples were dried in 130° C. convection oven until no further weight changes were recorded.

Example 35

Preparing Wax-Coated Cellulose Acetate Fiber Bundles (Sample AM9)

Cellulose acetate fiber bundles were prepared from cigarette filters ("Filter Tips" manufactured by TOP Tobacco L.P., Spain) by removing the paper that surrounded the fibrous filters and cutting the tips into 3-4 mm long small cylindrical-shaped bundles having an 8 mm diameter. 2.6 gm of the cut filter bundles were dipped into HydraBan 708 (scale wax emulsion, from Michelman). Excess liquid was decanted. The add-on weight of HydraBan 708 to the dry weight of the filter bundles was 86%. Samples were dried in 130° C. convection oven until no further weight changes were recorded.

Example 36

Preparation of Stearic Acid-Coated Cellulose Acetate Fibers (Sample AM 10)

Cellulose acetate fiber bundles were prepared from cigarette filters ("Filter Tips" manufactured by TOP Tobacco L.P., Spain) by removing the paper that surrounded the fibrous filters and cutting the tips into 3-4 mm long small cylindrical-shaped bundles having a 8 mm diameter. 2.6 gm of the cut filter bundles were dipped into a solution of 1 gm stearic acid (Aldrich) dissolved in 20 gm ethanol. All the liquid was absorbed by the fiber bundles. Samples were dried in 80° C. convection oven until no further weight changes were recorded. The sample was then ground in a food processor to form loose fibers.

Example 37

Preparation of Wax-Coated Cellulose Acetate Fibers (Samples AM11 and AM12)

Cellulose acetate fibers were prepared in accordance with Example 28. 2.6 gms of the fibers were dipped into 5% HydraBan 708 and excess liquid was squeezed off. For one set of samples (AM11), the add-on weight of HydraBan 708 on cigarette filter was 15%. For another set of samples (AM12), the add-on weight of HydraBan 708 was 35%. The samples were dried at 105-110° C. in the oven until no further weight changes were recorded.

Example 38

Preparation of Stearic Acid-Coated Cellulose Acetate Fibers (Sample AM 13)

Cellulose acetate fibers were prepared in accordance with Example 28. A solution was prepared by dissolving 0.31 gm of stearic acid in 15 gms of ethanol. 2.6 gms of the fibers were dipped into this solution and excess liquid was squeezed off. The add-on weight of stearic acid on the fiber bundles was 7%. The samples were vacuum-dried at 80° C. until no further weight changes were recorded.

Example 39

Preparation of Silane-Coated Cellulose Acetate Fibers (Sample AM14)

Cellulose acetate fibers were prepared in accordance with Example 28. A solution was prepared by dissolving 0.31 gm of Dow Corning 9-6346 (quaternary reactive silane) in 16 gms of 95:5 ethanol/water solution. 2.6 gm of the fibers were dipped into this solution and the excess liquid was squeezed off. The add-on weight of the DC 9-6346 silane on the fiber bundles was 4.5%. The samples were vacuum-dried at 80° C. until no further weight changes were recorded.

Example 40

Polypropylene Fibers (Sample AM15)

Polypropylene rope (¼ inch diameter, yellow pigmented, 212 lbs work load, T.W. Evans Cordage Co., Inc.) was untwisted and cut into 10 mm length individual fibers.

Example 41

Coating of Cellulose Acetate Fibers with Styrene Maleimide Copolymer (Sample AM16)

A 1% solution of Styrene Maleimide copolymer (SMA 30001 form Cray Valley, France) in water was prepared by stirring 0.5 g of the SMA 30001 in 50 ml of water containing 0.5 g of HC137%. 3 g of the previous solution was diluted with 20 ml of DI-water. Next 3 g of the cellulose acetate fibers prepared in accordance with Example 26 was added to the solution. The pH of the solution was increased to approximately 8 by adding NaOH 5M while stirring the mixture. The liquid was filtered off by gravity and the fibers were dried under vacuum at 70° C.

Example 42

Oil Absorbance Test

A sample of an absorbent material prepared in accordance with Examples 29-41 (AM1-AM16), each sample weighing about 2 gm, was placed in a wire mesh basket, weighed and immersed in a one-inch thick layer of medium crude oil. After 15 minutes of exposure, the basket was lifted from the oil bath and allowed to drip for about 30 seconds while being lightly shaken. The sample and the basket were then weighed. The difference between this weight and the initial weight corresponded to the amount of oil absorbed. A correction factor of 0.6 gms was subtracted from the final mass to account for oil adhering to the basket, yielding the corrected mass for each oil-exposed sample. The oil absorbance value for each sample was calculated by dividing the corrected mass by the dry mass.

Example 43

Water Absorbance Test

A sample of an absorbent material prepared in accordance with Examples 29-41 (AM1-AM16), each sample weighing about 0.75 gm, was placed in a plastic 500 ml bottle containing 250 ml of water. The bottle was placed horizontally on a shaker table for 15 minutes. After 15 minutes of exposure, the bottle was removed from the shaker table and the contents poured through a filter. The sample was removed from the filter, allowed to drop for approximately 30 seconds, and then weighed. The mass of water absorbed by the sample was calculated by subtracting the mass of the dry sample from the mass of the wet sample. The water absorbance value for each sample was calculated by dividing the mass of the wet sample by the mass of the dry sample.

Example 44

Comparing Oil Absorbance Values to Water Absorbance Values

For each of the samples prepared in accordance with Examples 29-41, the oil absorbance value and the water absorbance value was determined, as shown in Table 1. The oil absorbance value for each sample was plotted against the water absorbance value, as shown on Graph 1 in the FIGURE. Table 1 and the FIGURE also show that the values for the experimental samples (prepared in accordance with Examples 29-41) can be compared to the oil absorbance and water absorbance values for the controls (unmodified Filter Tips and unmodified cellulose acetate fiber bundles (Eastman)), and for one commercially available product (MOP® Maximum Oil Pickup, MOP Environmental Solutions, Inc.). Advantageously, an absorbent material displays a high oil absorbance value while minimizing the amount of water absorption.

TABLE 1

| Example | Absorbent Material Number | Description | Water Absorbance | Oil Absorbance |
|---|---|---|---|---|
| 29 | AM1 | Cellulose Acetate (fibrous strands) coated in vegetable oil | 14.64 | 18.13 |
| 29 | AM2 | Cellulose Acetate (fibrous strands) coated in crude oil | 16.24 | 20.9 |
| 29 | AM3 | Cellulose Acetate (fibrous strands) coated in mineral oil | 19.34 | N/A |
| 30 | AM4 | Cellulose Acetate (fibrous strands) coated in polyDADMAC and stearic acid | 13.71 | 25 |
| 31 | AM5 | Cellulose Acetate (fibrous strands) coated with polyDADMAC followed by stearic acid and mineral oil | 11.44 | 13.44 |
| 32 | AM6 | Cellulose Acetate (fibrous strands) coated with polyDADMAC followed by stearic acid/benzoic acid | 12.60 | 15.58 |
| 33 | AM7 | Cellulose Acetate (fibrous strands) coated with | 11.85 | 15.32 |

TABLE 1-continued

| Example | Absorbent Material Number | Description | Water Absorbance | Oil Absorbance |
|---|---|---|---|---|
| | | stearic acid | | |
| 34 | AM8 | Cellulose Acetate (small cylindrical shaped particles) coated with polyethylene | 5.74 | 5.28 |
| 35 | AM9 | Cellulose Acetate (small cylindrical shaped particles) coated with Hydroban 708 | 5.94 | 4.8 |
| 36 | AM10 | Cellulose Acetate (small cylindrical shaped particles) coated with stearic acid and then blended into fibrous strands | 11.00 | 15.6 |
| 37 | AM11 | Cellulose Acetate (fibrous strands) coated with Hydroban 708 | 8.93 | 9.93 |
| 37 | AM12 | Cellulose Acetate (fibrous strands) coated with Hydroban 708 | 8.56 | 10.18 |
| 38 | AM13 | Cellulose Acetate (fibrous strands) coated with stearic acid | 9.24 | 9.68 |
| 39 | AM14 | Quaternary alkylcyline | 12.74 | 10.59 |
| 40 | AM15 | Chopped up polypropylene strands | 0.52 | 2.8 |
| 41 | AM16 | Cellulose acetate (fibrous strands) coated with SMA-I | 13.92 | 21.73 |
| control | MOP 201 | Commercial product | 5.13 | 9.36 |
| control | Top Filter Tips | Cellulose Acetate (fibrous strands) | 23.43 | 23.46 |

Example 45

Preparation of PDAC Modified Substrate

A 0.1% solution of modifier was made by diluting a 20% solution of poly(diallyldimethylammonium chloride) (PDAC, from Aldrich Chemical) with water. Then 6.8 g of cellulose acetate was suspended in 1 liter of the 0.1% PDAC solution for 10 minutes while stirring the suspension. The excess PDAC solution was then drained and the substrate was dried at 100° C. for 30 minutes.

Example 46

Preparation of Chitosan Modified Substrate

A 0.1% solution was made by dissolving Chitosan CG800 (from Primex, Iceland) in acidic water (pH ~3.0) overnight while stirring. Then 20 g of cellulose acetate was suspended in 1 liter of the 0.1% chitosan solution and pH was raised to ~8 while stirring to enable chitosan deposition on the substrate. The solution was then drained and the substrate dried at 100° C. for 30 minutes.

Example 47

Preparation of Zein Modified Substrate

A 0.1% solution was made by diluting a 14% solution of Aquazein (Freeman Industries) in basic water (pH ~10). Then 20 g of cellulose acetate was suspended in 1 liter of the 0.1% Zein solution and pH was lowered to ~5 while stirring to enable Zein precipitation on the substrate. The solution was then drained and the substrate dried at 100° C. for 30 minutes.

Example 48

Preparation of Stearic Acid Modified Substrate

In a round bottom flask, 2.540 g stearic acid was dissolved in about 100 mL of ethanol. 9.583 g cellulose acetate (from Eastman Chemical) was added, and the mixture was shaken for 2 minutes. The ethanol was evaporated off with a rotary evaporator at 60° C.

Example 49

Preparation of Emulsion

A 0.01 wt % DDBSA (dodecylbenzenesulfonic acid, sodium salt) solution was prepared by dissolving DDBSA into water. Then, Isopar M (Exxon) was added to the solution until it was approximately 0.1 wt %. This mixture was then sheared in a Silverson L4RT-A homogenizer at 5500 RPM for 5 minutes. Foam was allowed to settle to the top before the emulsion was used.

Example 50

Calibration Curve for Oil Concentration Measurement

A calibration curve relating nephelometric turbidity to oil concentration was created using an emulsion of Example 49. The emulsion was diluted to various concentrations with distilled water ranging from 0% dilution to 99% dilution, and the resulting turbidities were measured with a Hach 2100P Turbidimeter. The calibration showed a linear relationship between turbidity and oil concentration.

Example 51

Set-Up of Gravity Feed Column

A preparative chromatography column of 1-1.5 inches in diameter and 150-200 mL in volume was filled with 50-80 mL of modified substrate of (examples 45-48). A beaker was placed under the column to catch liquid passing through the column. The column was then filled with water with the stopcock closed to allow the substrate to soak in water for 16-24 hours.

Example 52

Set-Up of Pump-Assisted Column

A flow-through glass column fitted with Ace-Thred end caps, having ~90 mL volume, was filled completely with ~16.5 g of modified substrate of Examples 45-48. The column was fitted vertically, with 3/8" OD (outer diameter) flexible tube leaving the top and heading to a beaker, and with 3/8" OD flexible tube leaving the bottom going to a three-way valve. The three way valve, each connection being 3/8" OD flexible tube, was plumbed such that fluid entering it could be directed either to the bottom of the column or to a drain. This three-way valve was fed by a Chem-Tech CTPD-2HS 1 peristaltic pump set at 10% of its maximum speed. The peristaltic pump drew from a bucket of emulsion of Example 49 that was continuously mixed with a 2-MD-SC Little Giant centrifugal pump.

Example 53

Gravity Feed Oil Removal Test

A column as described in Example 51 was prepared using 13 g of a sample of stearic acid modified cellulose acetate of Example 48 occupying 60 mL in the column. All excess water was removed by opening the stopcock and draining the column. An emulsion of Example 49 was prepared. 100 mL of the emulsion was poured into the top of the column, and the stopcock was used to set the initial flow rate to 9 mL/min. The flow rate was measured by measuring the mass of the fluid exiting the column over 15-30 seconds. The fluid leaving the column was collected periodically to measure its turbidity with the Hach 2100P Turbidimeter. The fluid entering the column had a turbidity of 370 NTU and the fluid leaving the column had a turbidity of 8 NTU, representing approximately 98% removal of oil.

Example 54

Gravity Feed Oil Removal Test

A column as described in Example 51 was prepared using 6.5 g of a sample of PDAC modified cellulose acetate of Example 45 occupying 69 mL in the column. All excess water was removed by opening the stopcock and draining the column. An emulsion of Example 49 was prepared. 100 mL of the emulsion was poured into the top of the column, and the stopcock was used to set the initial flow rate to 18 mL/min. The flow rate was measured by measuring the mass of the fluid exiting the column over 15-30 seconds. The fluid leaving the column was collected periodically to measure its turbidity with the Hach 2100P Turbidimeter. The fluid entering the column had a turbidity of 370 NTU and the fluid leaving the column had a turbidity of 27 NTU, representing the removal of approximately 93% of oil.

Example 55

Gravity Feed Oil Removal Test

A column as described in Example 51 was prepared using 6.2 g of a sample of Zein-modified cellulose acetate of Example 47 occupying 45 mL in the column. All excess water was removed by opening the stopcock and draining the column. An emulsion of Example 49 was prepared. 100 mL of the emulsion was poured into the top of the column, and the stopcock was used to set the initial flow rate to 3 mL/min. The flow rate was measured by measuring the mass of the fluid exiting the column over 15-30 seconds. The fluid leaving the column was collected periodically to measure its turbidity with the Hach 2100P Turbidimeter. The fluid entering the column had a turbidity of 950 NTU and the fluid leaving the column had a turbidity of 80 NTU, representing the removal of approximately 92% of oil.

Example 56

Gravity Feed Oil Removal Test

A column as described in Example 51 was prepared using 6.5 g of a sample of chitosan-modified cellulose acetate of Example 46 occupying 66 mL in the column. All excess water was removed by opening the stopcock and draining the column. An emulsion of Example 49 was prepared. 100 mL of the emulsion was poured into the top of the column, and the stopcock was used to set the initial flow rate to 5 mL/min. The flow rate was measured by measuring the mass of the fluid exiting the column over 15-30 seconds. The fluid leaving the column was collected periodically to measure its turbidity with the Hach 2100P Turbidimeter. The fluid entering the column had a turbidity of 950 NTU and the fluid leaving the column had a turbidity of 150 NTU, representing the removal of approximately 84% of oil.

Example 57

Gravity Feed Oil Removal Test

A column as described in Example 51 was prepared using 6.3 g of a sample of unmodified cellulose acetate occupying 64 mL in the column. All excess water was removed by opening the stopcock and draining the column. An emulsion of Example 49 was prepared. 100 mL of the emulsion was poured into the top of the column, and the stopcock was used to set the initial flow rate to 5 mL/min. The flow rate was measured by measuring the mass of the fluid exiting the column over 15-30 seconds. The fluid leaving the column was collected periodically to measure its turbidity with the Hach 2100P Turbidimeter. The fluid entering the column had a turbidity of 950 NTU and the fluid leaving the column had a turbidity of 380 NTU, representing the removal of approximately 60% of oil.

Table 2 below shows the results of Examples 53-57. As this table shows the modified fibers are more effective than the unmodified fibers at removing oil from water.

TABLE 2

| Example | Modifier used | % Removal of Oil |
|---|---|---|
| 53 | Stearic acid | 98 |
| 54 | pDAC | 93 |
| 55 | Zein | 92 |
| 56 | Chitosan | 84 |
| 57 | (none) | 60 |

Example 58

Pump Assisted Column Test

A system of Example 52 was set up using a sample of Example 48. The pump was turned on to pump the emulsion of Example 49 through the sample in the column at 14.6 g/min. Samples of the water entering the column (which were obtained from the drain port) and leaving the column were tested for turbidity to obtain Isopar concentration by the calibration of Example 50. Initially, the column reduced the about of emulsified Isopar in the water by 90-95%. After 60 g of Isopar had been removed from the emulsion (64 g had been detected entering the column and 4 g leaving), the concentration of Isopar passing the column began to rise. After a total of 93 g of Isopar had entered the column, the sample was removed and squeezed between two watch glasses to yield 17.5 g of material. Allowing the fluid to separate, one could see that about one third of this material was clear Isopar on the top layer, or about 6 g. This means that the remaining oil was removed from the emulsion by coalescing. Table 3 below shows the Isopar removal as function of time.

TABLE 3

| Total Mass Flowed (g) | Inlet Isopar Concentration wt % | Cumulative Oil Entered (g) | Outlet Isopar Concentration wt % | Cumulative Oil Exited (g) | % Isopar removed from emulsion % |
|---|---|---|---|---|---|
| 234 | 1.0% | 2.6 | 0.025% | 0.1 | 98% |
| 701 | 0.73% | 6.4 | 0.010% | 0.2 | 99% |
| 1533 | 0.59% | 11.9 | 0.068% | 0.8 | 88% |
| 1767 | 1.0% | 14.4 | 0.050% | 1.0 | 95% |
| 4234 | 0.80% | 41.5 | 0.074% | 2.9 | 91% |
| 5183 | 1.2% | 53.3 | 0.042% | 3.3 | 97% |
| 5971 | 1.3% | 63.5 | 0.088% | 3.9 | 93% |
| 6585 | 1.2% | 71.0 | 0.19% | 5.2 | 84% |
| 6774 | 1.1% | 73.2 | 0.27% | 5.8 | 76% |
| 7008 | 1.3% | 76.3 | 0.30% | 6.4 | 78% |
| 7227 | 1.2% | 79.1 | 0.36% | 7.1 | 71% |
| 8424 | 1.0% | 92.6 | 0.46% | 13.1 | 54% |

Example 59

A bowl of 150 g of Isopar M was placed on a balance. A 6.8 g sample of modified cellulose acetate of Example 48 was placed into the Isopar. After being totally immersed in the Isopar for about a minute, the sample was removed with tweezers and held above the bowl as it drained. When the rate of Isopar dripping from the modified cellulose acetate reached approximately 1 drop per second, the modified cellulose acetate was transferred to a beaker, and the loss in mass of the bowl of Isopar was reported as the Isopar absorbed by the modified cellulose acetate. The modified cellulose acetate was then pressed between two watch glasses or glass plates, and the liberated liquid was dropped into the beaker. The mass of the liquid liberated represented the Isopar that could be recovered by squeezing the modified cellulose acetate. The squeezed sample was returned to the bowl for another cycle of squeezing for 5 repetitions. The sample was found to absorb 19 g of Isopar when initially dry. Squeezing the saturated sample yielded about 6.5 g of Isopar. After squeezing, the sample was able to reabsorb about 6.5 g of Isopar.

Example 60

A bowl of 150 g of Isopar M was placed on a balance. A 6.4 g sample of unmodified cellulose acetate was placed into the Isopar. After being totally immersed in the Isopar for about a minute, the sample was removed with tweezers and held above the bowl as it drained. When the rate of Isopar dripping from the cellulose acetate reached approximately 1 drop per second, the cellulose acetate was transferred to a beaker, and the loss in mass of the bowl of Isopar was reported as the Isopar absorbed by the cellulose acetate. The cellulose acetate was then pressed between two watch glasses or glass plates, and the liberated liquid was dropped into the beaker. The mass of the liquid liberated represented the Isopar that could be recovered by squeezing the cellulose acetate. The squeezed sample was returned to the bowl for another cycle of squeezing for 5 repetitions. The sample was found to absorb 25 g of Isopar when initially dry. Squeezing the saturated sample yielded about 7.5 g of Isopar. After squeezing, the sample was able to reabsorb about 7.5 g of Isopar.

Example 61

A bowl of 200 g of Isopar M was placed on a balance. A 6.1 g sample of modified cellulose acetate of Example 48 was wetted with water, squeezed between two watch glasses, and then placed into the Isopar. After being totally immersed in the Isopar for about a minute, the sample was removed with tweezers and held above the bowl as it drained. When the rate of Isopar dripping from the modified cellulose acetate reached approximately 1 drop per second, the modified cellulose acetate was transferred to a beaker, and the loss in mass of the bowl of Isopar was reported as the Isopar absorbed by the modified cellulose acetate. The modified cellulose acetate was then pressed between two watch glasses or glass plates, and the liberated liquid was dropped into the beaker. The mass of the liquid liberated represented the Isopar that could be recovered by squeezing the modified cellulose acetate. The squeezed sample was returned to the bowl for another cycle of squeezing for 5 repetitions. The sample was found to absorb 7.4 g of Isopar when pre-wetted with water. Squeezing the saturated sample yielded about 4.3 g of material. After squeezing, the sample was able to reabsorb about 4.2 g of Isopar.

Example 62

A bowl of 200 g of Isopar M was placed on a balance. A 5.2 g sample of unmodified cellulose acetate was wetted with water, squeezed between two watch glasses, and then placed into the Isopar. After being totally immersed in the Isopar for about a minute, the sample was removed with tweezers and held above the bowl as it drained. When the rate of Isopar dripping from the cellulose acetate reached approximately 1 drop per second, the cellulose acetate was transferred to a beaker, and the loss in mass of the bowl of Isopar was reported as the Isopar absorbed by the cellulose acetate. The cellulose acetate was then pressed between two watch glasses or glass plates, and the liberated liquid was dropped into the beaker.

The mass of the liquid liberated represented the Isopar that could be recovered by squeezing the cellulose acetate. The squeezed sample was returned to the bowl for another cycle of squeezing for 5 repetitions. The sample was found to absorb 4.5 g of Isopar when pre-wetted with water. Squeezing the saturated sample yielded about 4.3 g of material. After squeezing, the sample was able to reabsorb about 3.9 g of Isopar.

Table 4 below shows the results of Examples 59-62. The results of Examples 59-60 demonstrate that, in the absence of water, the modified cellulose acetate fibers absorb less hydrocarbons than the unmodified fibers. Examples 61-62 demonstrate that in the presence of water, the modified cellulose acetate fibers absorb more hydrocarbons than the unmodified fibers.

TABLE 4

| Example | Modifier for cellulose acetate sorbent | Sorbent condition at beginning of test | Sorbent used in example (g), dry basis | Initial sorbent capacity of Isopar (g) | Isopar liberated by pressing (g) | Re-absorption capacity after pressing (g) |
|---|---|---|---|---|---|---|
| 59 | Stearic acid | Dry | 6.8 | 19 | 6.5 | 6.5 |
| 60 | None | Dry | 6.4 | 25 | 7.5 | 7.5 |
| 61 | Stearic acid | Saturated with water | 6.1 | 7.4 | 4.3 | 4.2 |
| 62 | None | Saturated with water | 6.2 | 4.5 | 4.3 | 3.9 |

EQUIVALENTS

While specific embodiments of the subject invention have been discussed, the above specification is illustrative and not restrictive. Many variations of the invention will become apparent to those skilled in the art upon review of this specification. Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth herein are approximations that can vary depending upon the desired properties sought to be obtained by the present invention.

While this invention has been particularly shown and described with references to preferred embodiments thereof, it will be understood by those skilled in the art that various changes in form and details may be made therein without departing from the scope of the invention encompassed by the appended claims.

What is claimed:

1. A system for removing a target oil from an aqueous fluid stream, comprising:
a capture medium that complexes with the oil to form a removable complex that can be removed from the aqueous fluid stream, thereby removing the target oil from the aqueous fluid stream,
wherein the capture medium comprises an anchor substrate and a modifier technology supported on the anchor substrate, the modifier technology complexing with the oil to form the removable complex;
wherein the modifier technology comprises an oleophilic capture substance; and
wherein the modifier technology further comprises an attachment chemical that attaches the oleophilic capture substance to the surface of the anchor substrate.

2. A method for removing a target oil from an aqueous fluid stream, comprising:
preparing a capture medium comprising an anchor substrate and a modifier technology supported on the anchor substrate, wherein the modifier technology complexes with the target oil to form a removable complex,
deploying the capture medium into contact with the target oil,
directing the capture medium to contact the target oil for a contact time such that the capture medium forms a removable complex with the target oil, and
removing the removable complex from the aqueous fluid stream, thereby removing the target oil from the aqueous fluid stream,
wherein the step of preparing takes place before the step of deploying,
wherein the anchor substrate has a density greater than that of the oil.

3. A method for removing a target oil from an aqueous fluid stream, comprising:
preparing a capture medium comprising an anchor substrate and a modifier technology supported on the anchor substrate, wherein the modifier technology complexes with the target oil to form a removable complex,
deploying the capture medium into contact with the target oil,
directing the capture medium to contact the target oil for a contact time such that the capture medium forms a removable complex with the target oil, and
removing the removable complex from the aqueous fluid stream, thereby
removing the target oil from the aqueous fluid stream;
wherein the step of preparing takes place before the step of deploying;
wherein the modifier technology comprises an oleophilic capture substance;
wherein the modifier technology further comprises an attachment technology that modifies the surface of the anchor substrate to attach the oleophilic capture substance thereto;
wherein the attachment technology comprises a physical modification of the surface of the anchor substrate; and
wherein the attachment technology comprises an attachment chemical that attaches the oleophilic capture substance to the surface of the anchor substrate.

4. A method for removing a target oil from an aqueous fluid stream, comprising:
combining the anchor substrate and a modifier technology supported on the anchor substrate to form a capture medium, wherein the modifier technology complexes with the target oil to form a removable complex,
contacting the capture medium with the fluid stream bearing the target oil for a contact time such that the capture medium forms a removable complex with the target oil, and
removing the removable complex from the aqueous fluid stream, thereby removing the target oil from the aqueous fluid stream;
wherein the step of combining takes place simultaneously with or following the step of contacting.

5. The method of claim 3, wherein the anchor substrate comprises a plurality of loose particles or a plurality of loose fibers.

6. The method of claim 3, wherein the anchor substrate comprises sand, barium sulfate, gypsum, clay, calcium carbonate, diatomaceous earth, ferric oxide, alumina, boron nitride, lead sulfide, and bagasse.

\* \* \* \* \*